May 17, 1966   D. F. FROST ETAL   3,251,570
MILKER HOSE AND UNIT HOLDER
Filed Oct. 6, 1964   2 Sheets-Sheet 1

Dorman F. Frost
James W. Snarr
INVENTORS

BY Clarence A. O'Brien
and Harvey B. Jacobson
Attorneys

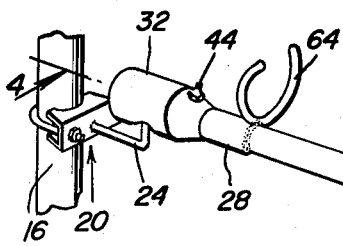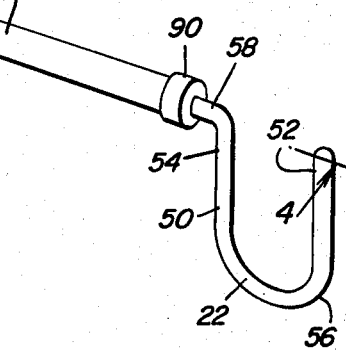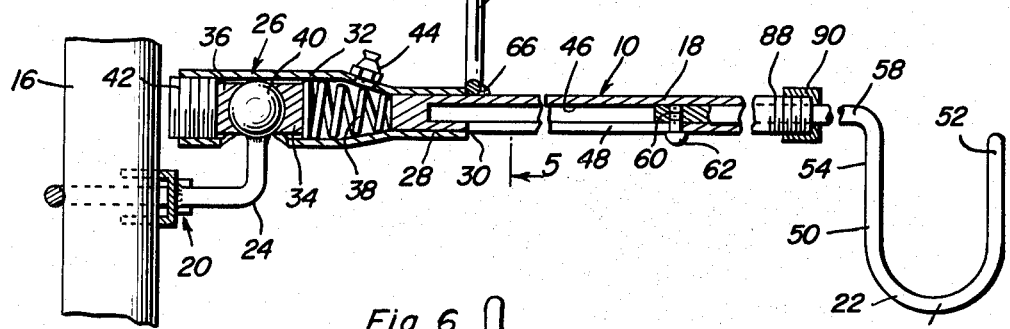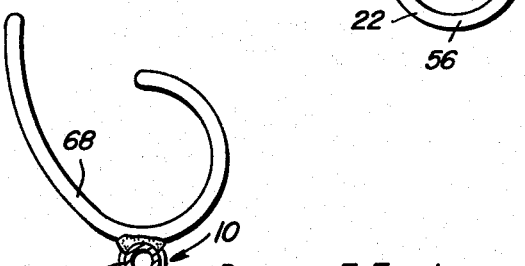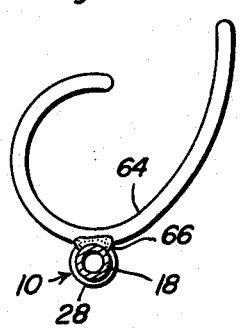

United States Patent Office 3,251,570
Patented May 17, 1966

3,251,570
MILKER HOSE AND UNIT HOLDER
Dorman F. Frost and James W. Snarr, Cedaredge, Colo.
Filed Oct. 6, 1964, Ser. No. 401,954
2 Claims. (Cl. 248—288)

This invention relates to a novel and useful milker hose and unit holder which is adapted to adjustably support a milker hose and unit in proper position relative to the udder of a cow in a milking stall.

The holder of the instant invention comprises an elongated support arm with means on one end adapted to removably support a milker unit and hose and a mounting bracket assembly is swivelly supported from the other end of the support arm and adapted to be secured to any suitable support adjacent the milking stall. The swivel connection between the support arm and the mounting clamp includes adjustable friction drag means which is operable to frictionally retain the support arm in adjusted swivelled positions relative to the mounting bracket. In this manner, the support arm may be clampingly secured at one end to a suitable upright pipe or the like and have the milker unit and hose supported from the free end of the arm. Thereafter, by swivelly adjusting the arm and also its effective length, the arm being longitudinally extendable, the milker unit may be placed precisely as desired.

The main object of this invention is to provide a novel and useful milker hose and unit support which will be capable of supporting the milker unit in precisely selected positions relative to a suitable support adjacent a milking stall.

Another object of this invention, in accordance with the immediately preceding object, is to provide a milker hose and unit support that may be readily moved to an out-of-the-way position disposed outside of the associated milking stall.

Still another object of this invention is to provide a support arm with a mounting clamp assembly swivelly supported from one end by means of a swivel assembly including adjustable friction drag means whereby the end of the support arm remote from the clamp assembly may be utilized to support a milker unit as desired.

Still another object of this invention is to provide a support for a milker unit and hose capable of supporting the milker unit as it is in an operative position beneath the udder of a cow whereby the associated milking unit may be operated at a lower vacuum without the cups falling off or away from the cow. By supporting the weight of the milker unit from the support arm of the instant invention and using less vacuum in the milking unit, the danger of mastitus occuring in the herd of dairy cows is greatly reduced, the presence of bacteria in the milk is more efficiently controlled and less work is involved in milking a herd of dairy cows.

A final object of this invention to be specifically enumerated herein is to provide a milker hose and unit holder in accordance with the preceding objects which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a perspective view of the milker unit support of the instant invention;

FIGURE 4 is a fragmentary vertical sectional view taken substantially upon the plane indicated by the section line 4—4 of FIGURE 3 and with portions of the milking unit support broken away;

FIGURE 5 is a transverse vertical sectional view taken substantially upon the plane indicated by the section line 5—5 of FIGURE 4;

FIGURE 6 is a transverse vertical sectional view similar to that of FIGURE 5 but showing a modified form of milker hose support.

Referring now more specifically to the drawings the numeral 10 generally designates the milker hose and unit support of the instant invention.

Figure 1:
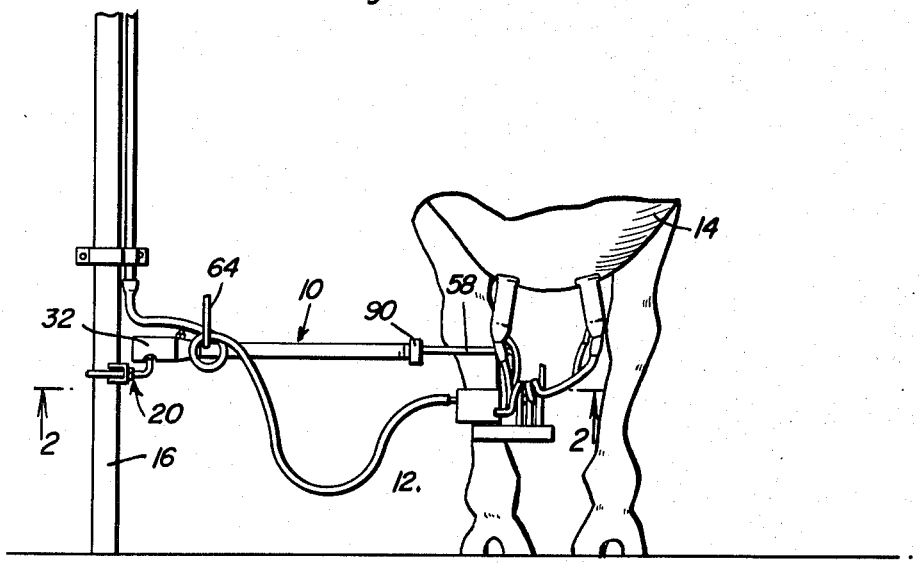
FIGURE 1 is a side elevational view of the milker hose and unit support of the instant invention shown supported from an upright adjacent a milking stall and in operation supporting a milker unit beneath the udder of a cow, portions of the cow being broken away.
Figure 2:
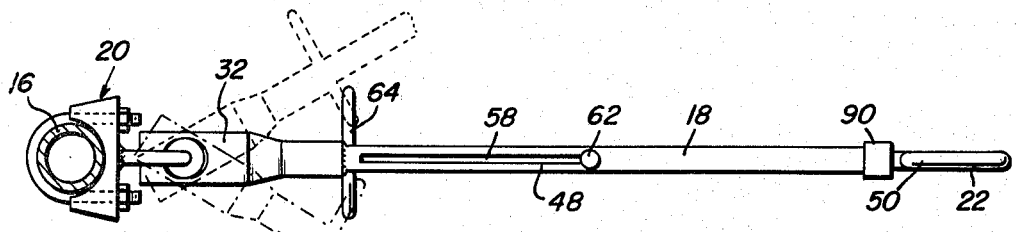
FIGURE 2 is a horizontal sectional view on somewhat of an enlarged scale taken substantially upon the plane indicated by the section line 2—2 of FIGURE 1.

In FIGURE 1 of the drawings portions of a milking stall 12 with a cow 14 disposed therein are illustrated and an upright pipe 16 is disposed adjacent the stall 12 and comprises the support for the milker hose and unit support 10.

The milker hose and unit support may best be seen in detail from FIGURES 1–4 of the drawings. The support 10 includes an elongated support arm 18 having a clamp mounting bracket generally referred to by the reference numeral 20 at one end and a milker hose and unit support hook 22 at its other end. The clamp assembly 20 includes an L-shaped shank portion 24 and the end of the shank portion 24 remote from the clamp 20 comprises a part of a swivel connection generally referred to by the reference numeral 26 and swivelly supporting one end to the arm 18 from the clamp assembly 20.

The end of the arm 18 adjacent the clamp assembly 20 has one end of a generally cylindrical housing 28 telescoped thereover and secured thereto as at 30. The cylindrical housing 28 includes a diametrically enlarged free end portion 32 in which a pair of spaced and opposing generally hemispherical socket members 34 and 36 are slidably disposed. A stiff compression spring 38 is disposed between the adjacent end of the arm 18 and the socket member 34, a spherical ball element 40 carried by the free end of the L-shaped shank 24 is disposed between the socket members 34 and 36, and a threaded retaining and thrust adjustment plug 42 is threadedly engaged in the open end of the diametrically enlarged portion 32 of the housing 28. Still further, the housing 28 has a Zerk lubrication fitting 44 secured thereto.

The end of the arm 18 remote from the housing 28 has a blind diametric bore 46 formed therein and a longitudinal slot 48 also formed therein which communicates with the bore 46.

A milker unit support hook 50 which is generally U-shaped in configuration and includes a pair of generally parallel upright legs 52 and 54 interconnected by means of an upwardly opening curved bight portion 56 is carried by the free end of the arm 18 and includes an elongated shank portion 58 which is telescopically and slidably disposed in the blind bore 46. The shank portion 58 has a transverse threaded bore 60 formed in its end remote from the hook 50 and a threaded screw type fastener 62 is threadedly engaged in the bore 60 and slidably disposed in the slot 48 for limiting longitudinal reciprocation of the shank 58.

An upwardly opening cradle 64 is secured to the arm 18 adjacent the small diameter end of the housing 28 by means of welding 66 and is utilized to cradle and support the hose of the milker unit. In addition, a lefthanded upwardly opening cradle 68 similar to and in lieu of the cradle 18 may be provided if desired.

Figure 7:
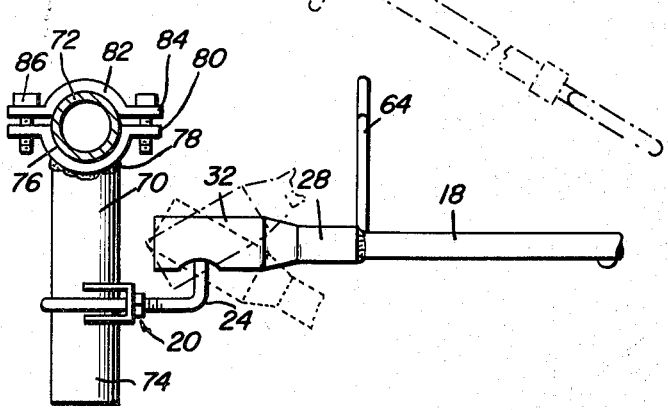
FIGURE 7 is a somewhat enlarged fragmentary side elevational view of the milker hose and unit support showing the manner in which it may be provided with a mounting accessory adapting it to be clampingly secured to a horizontal pipe as opposed to a vertical pipe.

With attention now invited to FIGURE 7 of the drawings there will be seen an adapted attachment generally referred to by the reference numeral 70. The adapter attachment 70 is designed to provide a means whereby the support 10 may be supported from a horizontal supporting pipe 72 in the same manner in which it is supported from the vertical supporting pipe 16. The attachment 70 includes a short pipe section 74 to which the clamp assembly 20 may be secured as previously described. One end of the pipe section 74 is welded to a generally semicylindrical pipe clamp half 76 as at 78. The pipe clamp half 76 includes a pair of mounting ears 80 including threaded bores and a second clamp half 82 opposes the half 76 and includes apertured mounting ears 84. Suitable fasteners 86 are then secured through the ears 80 and 84 in a manner so as to clamp the halves 76 and 82 about the horizontal pipe 72.

From FIGURE 4 of the drawings it may be seen that the shank portion 58 may be shifted axially relative to the support arm 18 and that the threaded fastener 62 limits longitudinal shifting of the shank portion 58 by means of its being captive in the slot 48 formed in the arm 18.

The free end of the arm 18 is externally threaded as at 88 and an end cap and packing nut 90 or the like is threadedly engaged on the free end of arm 18. If it is desired, the free end of the arm 18 may be provided with circumferential and longitudinally extending slots and the mating threads on the arm 18 and the cap 90 may be tapered in order that tightening of the cap 90 will cause the free terminal end portion of the arm 18 to frictionally grip shank portion 58 whereby the latter may be secured in adjusted extended positions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A milker hose and unit support comprising an elongated support arm, said support arm including means at one end adapted to support a milker unit, a mounting bracket assembly adapted to be secured to a suitable support adjacent a milking stall, means swivelly supporting the other end of said support arm from said mounting bracket assembly, and for rotation of said support arm about its longitudinal axis relative to said mounting bracket assembly, said means swivelly and rotatably supporting said support arm from said mounting bracket including friction drag means operable to frictionally retain said support arm in adjusted swiveled and rotated positions relative to said mounting bracket, said friction drag means including means for adjusting the frictional resistance effected thereby to movement of said arm relative to said mounting bracket, said one end of said arm having a blind longitudinal bore formed therein, said means adapted to support a milker unit including a hook member having an elongated shank portion telescopically and slidably received in said bore and including a hook portion on its free end opening and disposed laterally to one side of said shank portion, second friction drag means connected between said arm and said shank portion frictionally retaining said shank portion in adjusted extended position relative to said arm, said arm having a longitudinal slot formed therein spaced from said one end thereof and communicated with said bore, said shank portion having a threaded radial bore formed therein aligned with said slot, an externally threaded shank type stop member threadedly engaged in said threaded bore and slidably disposed in said slot limiting longitudinal adjustment of said shank portion relative to said arm, said arm, adjacent said other end thereof, including a cradle member adapted to removably cradle and support a milker unit hose connected to said unit.

2. The combination of claim 1 wherein said mounting bracket comprises a pipe clamp.

References Cited by the Examiner

UNITED STATES PATENTS

| 1,682,693 | 9/1928 | Day | 248—274 |
| 1,749,024 | 3/1930 | Tennel | 297—21 |
| 1,754,929 | 4/1930 | Atticks et al | 248—230 |
| 2,496,478 | 2/1950 | Kinnebrew | 248—230 |
| 2,590,201 | 3/1952 | Nielsen | 280—513 |
| 2,598,045 | 5/1952 | Fox et al. | 175—100.4 |

FOREIGN PATENTS

| 826,546 | 1/1938 | France. |
| 912,625 | 12/1962 | Great Britain. |
| 39,138 | 12/1913 | Norway. |

CLAUDE A. LE ROY, *Primary Examiner.*

CHANCELLOR E. HARRIS, *Examiner.*

J. F. FOSS, *Assistant Examiner.*